(12) United States Patent
Roche

(10) Patent No.: US 10,453,107 B2
(45) Date of Patent: Oct. 22, 2019

(54) SYSTEM AND METHOD FOR PROCURING TAXICAB SERVICE

(75) Inventor: Mark Roche, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1527 days.

(21) Appl. No.: 11/830,220

(22) Filed: Jul. 30, 2007

(65) Prior Publication Data
US 2009/0037194 A1 Feb. 5, 2009

(51) Int. Cl.
*G08G 1/00* (2006.01)
*G06Q 10/02* (2012.01)
*G06Q 50/18* (2012.01)
*G06Q 30/06* (2012.01)

(52) U.S. Cl.
CPC ........... *G06Q 30/06* (2013.01); *G06Q 10/02* (2013.01); *G06Q 50/188* (2013.01); *G08G 1/202* (2013.01)

(58) Field of Classification Search
CPC ......... G06Q 10/02; G06Q 50/30; G08G 1/202
USPC ...................................................... 705/5, 1.1
See application file for complete search history.

(56) References Cited

U.S. PATENT DOCUMENTS

| | | | | |
|---|---|---|---|---|
| 2,536,290 A * | 1/1951 | Jones | | 340/990 |
| 4,992,940 A * | 2/1991 | Dworkin | | G06Q 10/087 235/383 |
| 5,408,695 A * | 4/1995 | Dorr | | 455/226.1 |
| 5,432,840 A | 7/1995 | Ryden | | |
| 5,636,122 A * | 6/1997 | Shah et al. | | 701/207 |
| 5,922,040 A * | 7/1999 | Prabhakaran | | 701/117 |
| 5,945,919 A * | 8/1999 | Trask | | 340/8.1 |
| 5,973,619 A * | 10/1999 | Paredes | | 340/994 |
| 6,456,207 B1 * | 9/2002 | Yen | | G08G 1/202 235/384 |
| 2001/0037174 A1* | 11/2001 | Dickerson | | 701/200 |
| 2003/0065556 A1 | 4/2003 | Takanashi et al. | | |
| 2004/0177109 A1 | 9/2004 | Lee | | |
| 2004/0219933 A1* | 11/2004 | Faith | | 455/456.3 |
| 2005/0182743 A1* | 8/2005 | Koenig | | G06F 19/327 |
| 2006/0034201 A1 | 2/2006 | Umeda et al. | | |
| 2006/0059023 A1* | 3/2006 | Mashinsky | | 705/5 |
| 2006/0069577 A1 | 3/2006 | Schmitt et al. | | |
| 2006/0099963 A1 | 5/2006 | Stephens | | |
| 2007/0150369 A1 | 6/2007 | Zivin | | |
| 2008/0059270 A1 | 3/2008 | Baumer et al. | | |
| 2008/0189148 A1* | 8/2008 | Diaz et al. | | 705/6 |

FOREIGN PATENT DOCUMENTS

WO WO 2007021076 A1 * 2/2007

OTHER PUBLICATIONS

Diaz et al., U.S. Appl. No. 60/888,614.*
https://loopt.com/loopt/tour.aspx?section=[1,2,3], Downloaded on Mar. 31, 2008, 3 pages.

* cited by examiner

*Primary Examiner* — Julie M Shanker
(74) *Attorney, Agent, or Firm* — Guntin & Gust, PLC; Mark Wilinski

(57) ABSTRACT

A system that incorporates teachings of the present disclosure may include, for example, a dispatch system having a controller element to receive from a communication device a first wireless message including a location coordinate and a request for taxicab service, and determine available taxicab services according to the location coordinate and the request. Additional embodiments are disclosed.

14 Claims, 3 Drawing Sheets

100

116, 119

SYSTEM AND METHOD FOR PROCURING TAXICAB SERVICE

FIELD OF THE DISCLOSURE

The present disclosure relates generally to procurement techniques, and more specifically to a system and method for procuring taxicab service.

BACKGROUND

Even with a large number of taxicabs in large metropolitan areas like New York city or Chicago, it is often difficult to hail a taxicab. Some taxicab companies provide a telephone number which you can call to let a service agent know where you are while s/he dispatches a taxicab to your location. This type of service however can be slow and costly.

DETAILED DESCRIPTION

In one embodiment of the present disclosure, a computer-readable storage medium in a communication device can have computer instructions for transmitting to a dispatch center a first wireless message including a location coordinate and a description of a taxicab service requested. The storage medium can also have computer instructions for receiving from the dispatch center a second wireless message including a taxicab arrival time.

In one embodiment of the present disclosure, a dispatch system can have a controller element to receive from a communication device a first wireless message including a location coordinate and a request for taxicab service, and determine available taxicab services according to the location coordinate and the request.

In one embodiment of the present disclosure, a method can involve selecting a taxicab according to a wireless message transmitted by a communication device. The wireless message can have a location coordinate and description of a desired taxicab service.

Figure 1:
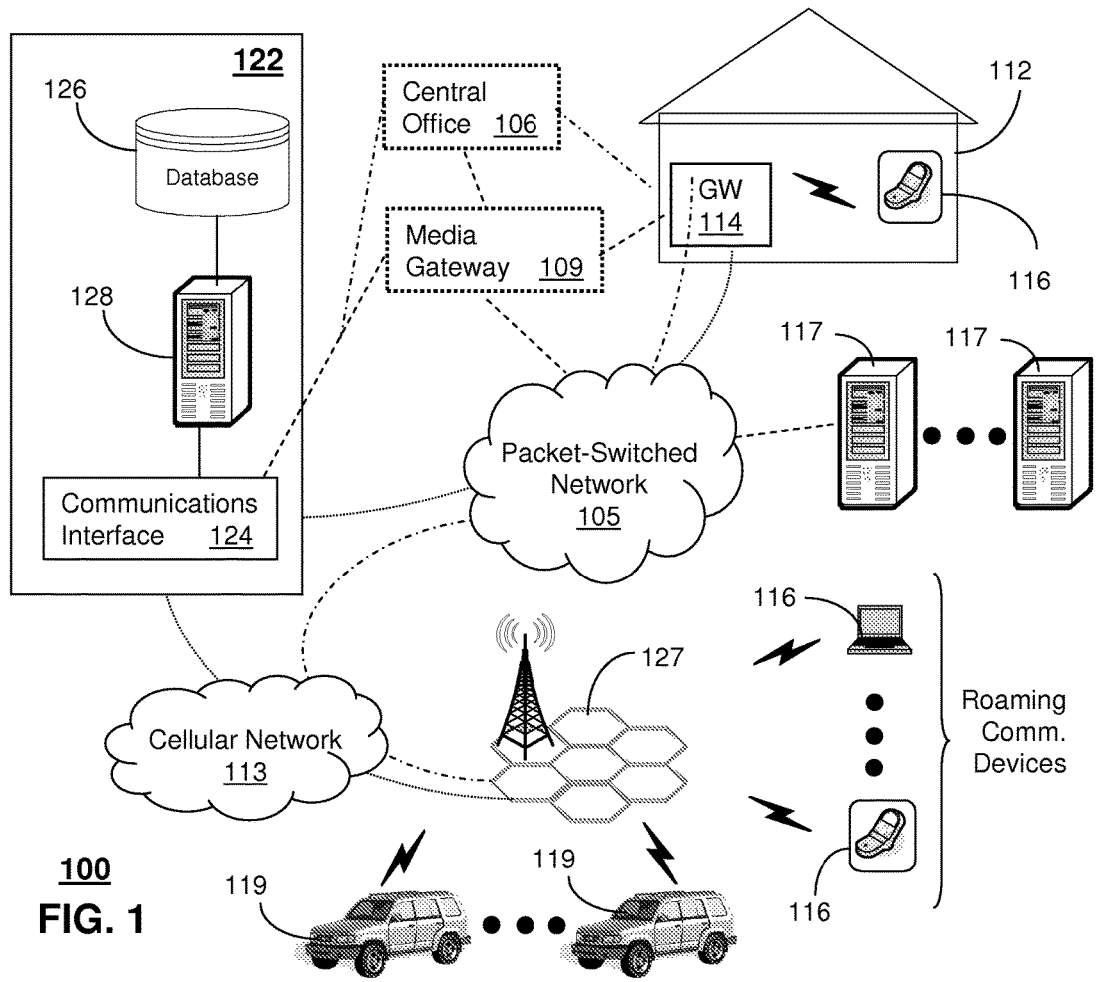
FIG. 1 depicts an exemplary embodiment of a communication system.

FIG. 1 depicts an exemplary embodiment of a mobile communication device 116 communicating by way of wireless access points and/or wired infrastructure with other communication devices and/or a network proxy or web server 122, which collectively operate in a communication system 100. The communication device 116 can be a VoIP or PSTN terminal. However, the present disclosure contemplates the use of other types of communication devices, including other types of voice, video and data devices. The communication system 100 can comprise a packet-switched network 105. The packet-switched network can be an Internet Service Provider (ISP) network 105 that utilizes technology for transporting Internet traffic. The network 105 can be coupled to the network proxy 122, the cellular network 113 and network elements located in one or more of the buildings 112 representing an enterprise or residence.

In an enterprise setting, the building 112 can include a gateway 114 that provides voice and/or video connectivity services between communication devices 116, such as VoIP or PSTN terminals or other forms of communication devices of enterprise personnel. In a residential setting, the building 112 can include a gateway 114 represented by, for example, a residential gateway coupled to central office 106 utilizing common telephonic equipment for providing voice, video and/or data services.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112. Telecommunication services of the central office 106 can include POTS (Plain Old Telephone Service), VoIP (Voice over Internet Protocol), and broadband services such as HDTV, xDSL, IPTV (Internet Protocol Television), Internet services, and so on. The communication system 100 can utilize common computing and communications technologies to support circuit-switched and/or packet-switched communications.

The cellular network 113 can support voice and data services over a number of wireless access technologies such as GSM-GPRS, EDGE, CDMA-1x, W-CDMA/HSDPA, EVDO, UMTS, WiMAX, Ultra Wide Band (UWB), software defined radio (SDR), and other known and future technologies. The cellular network 113 can be coupled to base stations 127 under a frequency-reuse plan for communicating over-the-air with roaming PSTN or VoIP terminals 116.

One or more taxicab dispatch centers 117 can also be coupled to network 105 to provide a user of a communication device 116 taxicab services while in transit. The dispatch centers 117 can utilize common computing and communications technology to receive wireless messages from mobile communication devices 116 and exchange wireless messages with taxicabs 119 roaming in the communication system 100. The taxicabs 117 can incorporate the same or similar technology as the communication devices 116 to exchange wireless messages with the dispatch centers 117

Figure 2:
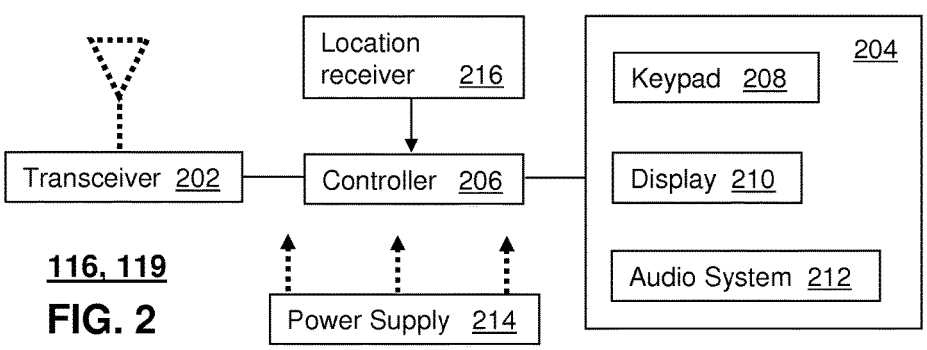
FIG. 2 depicts an exemplary embodiment of a communication device operating in the communication system.

FIG. 2 depicts an exemplary embodiment of the communication device 116. The communication device 116 can comprise a wireless transceiver 202, a user interface (UI) 204, a power supply 214, a location receiver 216, and a controller 206 for managing operations thereof. The transceiver 202 can utilize common technologies to support singly or in combination any number of wireless access technologies including without limitation cordless phone technology (e.g., DECT), Bluetooth™, Wireless Fidelity (WiFi), WiMAX, UWB, SDR, and cellular access technologies such as CDMA-LX, W-CDMA/HSDPA, UMTS, GSM/GPRS, TDMA/EDGE, and EVDO. Next generation wireless access technologies can also be applied to the present disclosure.

The UI 204 can include a keypad 208 with a depressible or touch sensitive navigation disk and keys for manipulating operations of the communication device 116. The UI 204 can further include a display 210 such as monochrome or color LCD (Liquid Crystal Display) for conveying images to the end user of the communication device 116, and an audio system 212 that utilizes common audio technology for conveying and receiving audible signals of the end user.

The power supply 214 can utilize common power management technologies such as replaceable batteries, supply regulation technologies, and charging system technologies for supplying energy to the components of the communication device 116 and to facilitate portable applications. In stationary applications, the power supply 214 can be modified so as to extract energy from a common wall outlet and thereby supply DC power to the components of the communication device 116.

The location receiver 216 can correspond to a Global Positioning System (GPS) receiver that processes satellite signals from a constellation of satellites to determine a location fix of the communication device 116. This feature can be applied to the communication devices utilized by the taxicabs 119.

The controller 206 can utilize computing technologies such as a microprocessor and/or digital signal processor (DSP) with associated storage memory such a Flash, ROM, RAM, SRAM, DRAM or other like technologies for controlling operations of the aforementioned components of the communication device 116.

Figure 3:
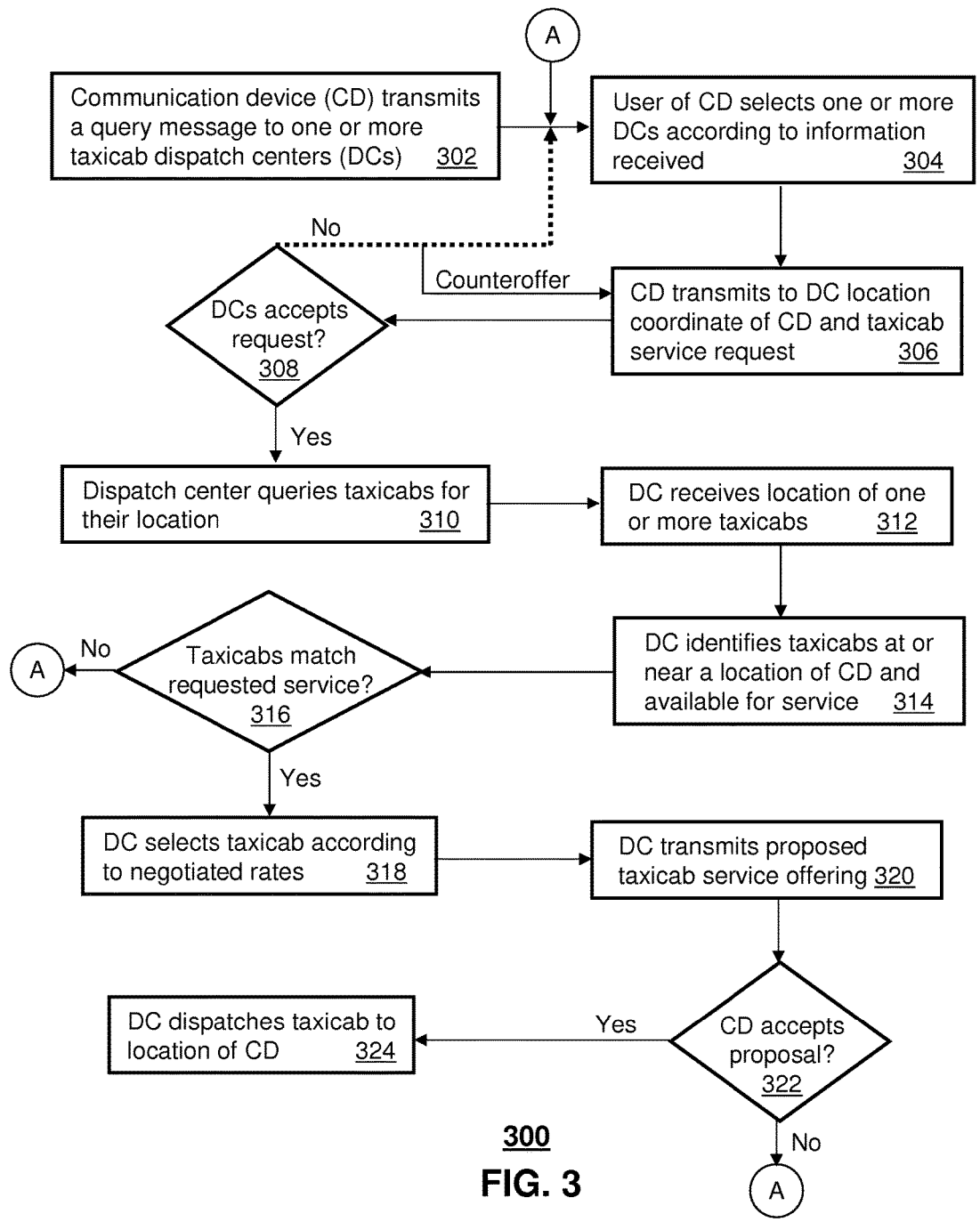
FIG. 3 depicts an exemplary method operating in portions of the communication system.

FIG. 3 depicts an exemplary method 300 operating in portions of the communication system 100. It would be apparent to an artisan with ordinary skill in the art that other embodiments not depicted in FIG. 3 are possible without departing from the scope of the claims described below. Method 300 begins with step 302 in which a communication device 116 under the direction of a user transmits a query message to one or more taxicab dispatch centers 117. The query message can include a request for taxicab service information from each dispatch center 117.

This step can be the result of for example the user selecting an iconic symbol or item in a drop down menu of the UI 204 to invoke a search for the availability of taxicab services. The query message can be an instant messaging (IM) message, a short messaging service (SMS) message or a multimedia messaging service (MMS) message directed to known Universal Resource Locators (URLs) of taxicab companies. Each of the dispatch centers 117 queried can respond with information that is wirelessly transmitted to the communication device 116 by way of one of the base stations 127. The information received can include working hours, location of services (e.g., cities, states), types of vehicles available (e.g., sedans, SUVs, vans), and average service fees.

According to this information, the user of the communication device 116 can select in step 304 one or more dispatch centers 117 of interest. Upon making this selection, the communication device 116 generates another message which includes a location coordinate of the communication device derived by common means from the location receiver 216 as described earlier. The message can further include a description of the taxicab service requested. For example, the description can include a desired pickup time (which can be a few minutes after the present time at which the wireless message is created), an automobile preference type (sedan, SUV, van), a destination, a number of passengers to be transported to said destination, ages and/or gender of said passengers, and/or a preferred taxicab driver. In one embodiment, the request can also include a proposed fee for the taxicab service requested.

The resulting message is wirelessly transmitted in step 306 by the communication device 116 as an IM message, an SMS message, or an MMS message to the one or more dispatch centers 117 selected in step 304. In step 308, the one or more dispatch centers 117 can accept, reject or submit a counteroffer to the user of the communication device 116. In this context, the exchange with the dispatch centers 117 can take the form of a reverse auction in which the user of the communication device 116 (acting as a buyer of services) supplies a proposed offer to the dispatch centers (sellers of taxicab services). If the offer is rejected by one or more of the dispatch centers 117, the user can select another dispatch center 117 in step 304 and restart the bidding process. If a dispatch center 117 submits a counteroffer, the communication device 116 in step 306 can present the counteroffer to the user of the communication device by way of its UI 204. The user can then accept or modify the counteroffer which is then transmitted by the communication device 116 wirelessly to the dispatch center 117 which furthers the negotiations.

When one or more of the dispatch centers 117 accept the request, said centers submit queries to taxicabs in their service fleet to determine their location and availability. These query messages can be transmitted wirelessly to communication devices such as reference 116 integrated in the taxicabs or carried by its drivers. The communication devices can have GPS receivers to provide the dispatch center 117 a location coordinate for the taxicab. The availability of a select taxicab to accept new passengers can be known to the dispatch center 117 utilizing common tracking and database techniques or can be determined from a response supplied by the taxicab driver by way of the communication device using text, DTMF signaling or voice responses.

Upon receiving responses in step 312, the dispatch center 117 identifies in step 314 one or more taxicabs at or near a vicinity of the communication device 116 that generated the taxicab service request. In step 316, the dispatch center can determine if the taxicabs identified in step 314 match or nearly match the requested service. A match can occur when the taxicab service meets all of the criteria set forth in the description given with the service request. For example, a user may ask for a van with accommodations to fit five passengers, a year, make and model of the taxicab, and amenities such as air conditioning, FM radio, and so forth. Exact or near matches to this criteria can be accepted by the dispatch center 117. If for example a match cannot be found on critical portions of the request (e.g., room for five passengers), the dispatch center 117 can submit a wireless message to the communication device 116 indicating that it could not find a taxicab matching the requested service. In this instance, the user can select another taxicab company in step 304 or wait to hear from other dispatch centers 117 that accepted the request in step 308.

Once a match or near match is found, the dispatch center 117 selects in step 318 the taxicab according to negotiated rates and transmits in step 320 another wireless message to the communication device 116 with a proposed taxicab service offering. The negotiated rate with the selected taxicab can be prearranged between the taxicab driver and the taxicab company or can be negotiated between the taxicab driver and the dispatch center 117 in real time. The proposed taxicab service can describe to the user of the communication device 116 by way of its UI 204 the type of taxicab that has been selected (make, year and model), the expected arrival time of said taxicab, the passenger capacity of the vehicle, the luggage room available, the taxicab driver's name, amenities, and so on. The description can also provide a percentage of a match between the request initially submitted in step 306 and the taxicab service offering. This feature could be used by the user to more readily identifying the taxicab offerings closely matching the request.

The user of the communication device 116 can in step 322 accept or reject the proposal. In most instances where there is an exact match it would be expected that the user will accept the offer by way of the UI 204, which in turn invokes a transmission from the communication device 116 of a wireless message directed to the dispatch center 117 to fulfill the transaction. The dispatch center 117 can submit in response a wireless message to the selected taxicab in step 324 dispatching it to the location of the communication device 116. The wireless message can include among other things the location of the user of the communication device 116, a description of the requesting party (e.g., 5 passengers or more specifically two adults and three children), means of payment (prepaid, credit card, cash), destination, and so on.

The fulfillment message transmitted by the communication device 116 can include an acceptance and credit or debit card information to pay for the taxicab service fee if the user prefers not to pay upon arriving at the point of destination. If the user rejects the taxicab service offer in step 322, said user can proceed back to step 304 to search for other dispatch centers 117 by way of UI 204 or wait for other responses from pending dispatch centers.

From the foregoing descriptions, it would be evident to an artisan with ordinary skill in the art that the aforementioned embodiments can be modified, reduced, or enhanced without departing from the scope and spirit of the claims described below. For example, the dispatch centers 117 in steps 318-320 can each select more than one taxicab. More than one selection may be appropriate when an exact match cannot be found in step 316 and providing the user of the communication device 116 more than one option may be helpful in convincing said user to procure the taxicab services offered by the dispatch center 117. In another embodiment, the dispatch center 117 can be a distributed system that is incorporated by each taxicab in a fleet. In this embodiment, the taxicabs can collectively perform the functions described by method 300.

These are but a few examples of the modifications that can be applied to the present disclosure without departing from the scope of the claims. Accordingly, the reader is directed to the claims for a fuller understanding of the breadth and scope of the present disclosure.

Figure 4:
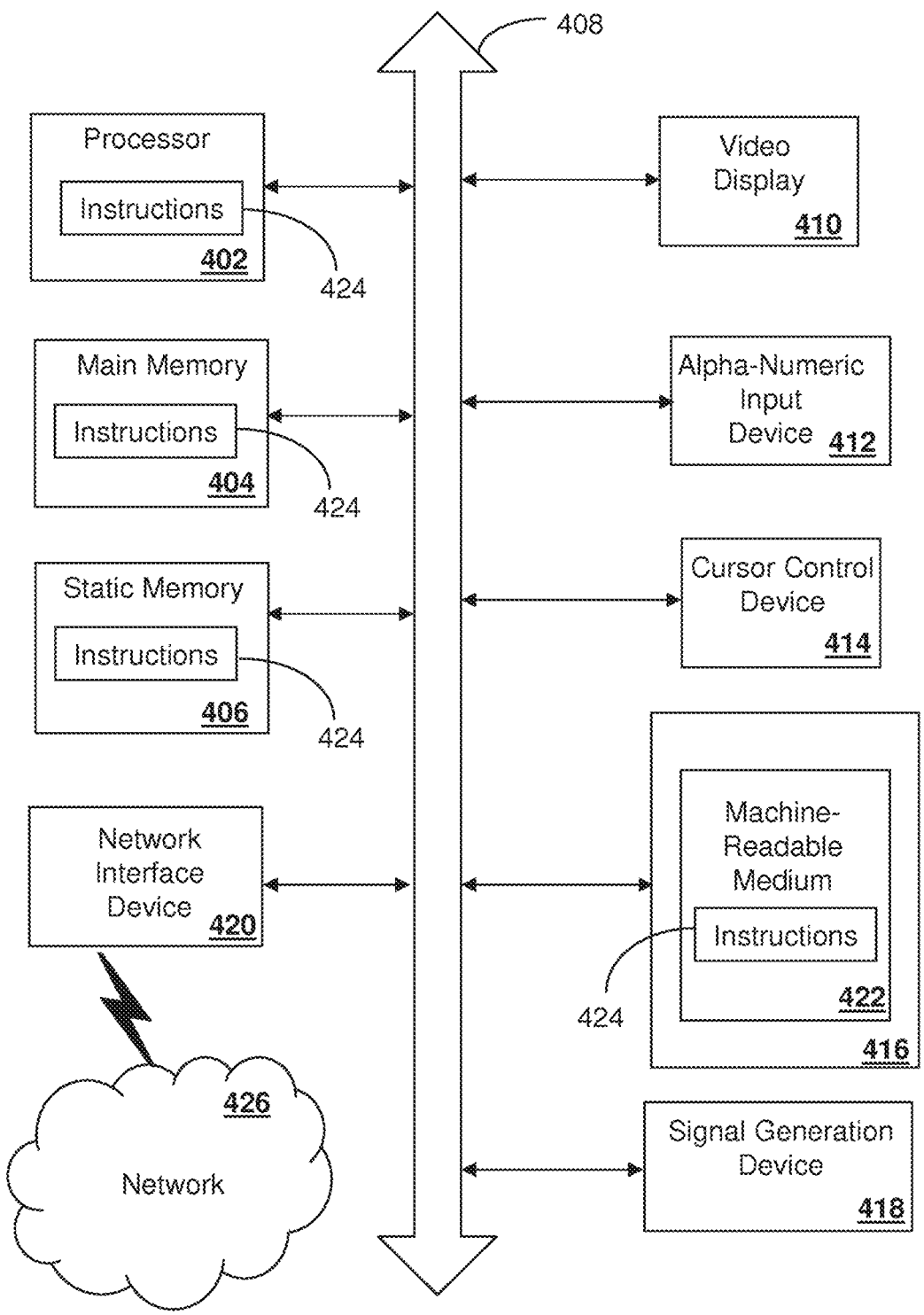
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processing system including a processor of a mobile communication device, facilitate performance of operations, comprising:

determining a location coordinate of the mobile communication device using a location receiver of the mobile communication device that processes signals to determine the location coordinate;

presenting an icon on a display device of the mobile communication device, the icon being associated with obtaining a car service;

in conjunction with receiving a selection of the icon, generating a first wireless message transmitted over a network to a plurality of dispatch centers causing the plurality of dispatch centers to provide a response wirelessly, wherein the responses comprises general car service information associated with each dispatch center of the plurality of dispatch centers;
presenting the general car service information associated with each dispatch center of the plurality of dispatch centers on the display device of the mobile communication device;
responsive to the presenting of the general car service information, receiving first user input from equipment of a user via a user interface of the mobile communication device, wherein the first user input identifies a user selected dispatch center of the plurality of dispatch centers;
responsive to the receiving of the first user input:
generating a description of a requested vehicle service according to the first user input, wherein the description identifies a type of automobile;
generating a second wireless message that includes the location coordinate and the description of the requested vehicle service;
transmitting the second wireless message from the mobile communication device over a network to the user selected dispatch center including a dispatch processor comprising a circuit and memory to cause the dispatch processor to determine match percentages for a group of vehicles associated with the user selected dispatch center, and to select a subgroup of proposed vehicles from among the group of vehicles associated with the user selected dispatch center, wherein the match percentages are determined according to the location coordinate of the mobile communication device, the description of the requested vehicle service, location information for the group of vehicles, wherein the selection of the subgroup of proposed vehicles from among the group of vehicles by the dispatch processor is performed according to the match percentages and without drivers of the subgroup of proposed vehicles responding to the second wireless message, and wherein an availability for the subgroup of proposed vehicles is determined by the dispatch processor according to an availability response received by the dispatch processor from communication devices of the subgroup of proposed vehicles;
receiving a third wireless message at the mobile communication device over the network from the dispatch processor of the user selected dispatch center, wherein the third wireless message comprises match percentages for the subgroup of proposed vehicles, an arrival time of the subgroup of proposed vehicles, average service fees for the requested vehicle service, and proposed service fees for the requested vehicle service to be provided by the subgroup of proposed vehicles, wherein the proposed service fees for the requested vehicle service to be provided by the subgroup of proposed vehicles are at rates that are determined via negotiations associated with the subgroup of proposed vehicles and the dispatch processor prior to the transmitting of the second wireless message, wherein the rates that are determined via the negotiations with the dispatch processor are based on communications between the dispatch processor and the communication devices of the subgroup of proposed vehicles, wherein the requested vehicle service is paid for by way of credit card data associated with the user of the mobile communication device, wherein the credit card data is obtained by the dispatch processor to cause the dispatch processor to complete a payment transaction for the requested vehicle service; and
presenting on the display device of the mobile communication device, particular car service information comprising the arrival time of the subgroup of proposed vehicles, the average service fees for the requested vehicle service, the match percentages of the subgroup of proposed vehicles and the proposed service fees for the requested vehicle service at the display device of the mobile communication device;
receiving second user input from the equipment of the user via the user interface of the mobile communication device, wherein the second user input determines a selected one of the subgroup of proposed vehicles according to the presenting of the particular car service information associated with each vehicle of the subgroup of proposed vehicles; and
responsive to the receiving of the second user input, providing a fourth wireless message to the dispatch processor of the user selected dispatch center to cause the dispatch processor to notify the selected one of the subgroup of proposed vehicles to initiate the requested vehicle service such that the selected one of the subgroup of proposed vehicles provides the requested vehicle service.

2. The non-transitory, machine-readable storage medium of claim 1, wherein the receiving of the first user input via the user interface comprises a selection by the user of an icon presented on the display device of the mobile communication device, and wherein the availability response received by the dispatch processor from the communication device of the selected one of the subgroup of proposed vehicles comprises a text message.

3. The non-transitory, machine-readable storage medium of claim 1, wherein the description of the requested vehicle service identifies a desired pickup time and a number of passengers.

4. The non-transitory, machine-readable storage medium of claim 1, wherein the availability for each vehicle of the group of vehicles is determined by the dispatch processor according to monitoring communications of communication devices of each vehicle of the group of vehicles, and wherein the third wireless message comprises an identification of the drivers of the subgroup of proposed vehicles.

5. The non-transitory, machine-readable storage medium of claim 1, wherein the operations further comprise providing payment information including the credit card data from the mobile communication device over the network to the dispatch processor.

6. The non-transitory, machine-readable storage medium of claim 1, wherein the description of the requested vehicle service comprises a destination.

7. The non-transitory, machine-readable storage medium of claim 1, wherein the first wireless message corresponds to an instant messaging message.

8. A dispatch system, comprising:
a memory that stores executable instructions; and
a controller circuit comprising a processing system including a processor coupled with the memory, wherein the controller circuit, responsive to executing the instructions, facilitates performance of operations comprising:
receiving a first wireless message requesting general car service information over a network from a mobile communication device;

determining payment information for a user of the mobile communication device, wherein the payment information includes credit card data associated with the user;

generating and providing a second wireless message over the network to the mobile communication device providing the general car service information of a vehicle service associated with a car service company before determining a location coordinate of the mobile communication device;

receiving a third wireless message over a network from the mobile communication device responsive to the providing of the general car service information, wherein the third wireless message comprises the location coordinate derived from a location receiver in the mobile communication device and a request for the vehicle service generated by the mobile communication device according to user input at the mobile communication device;

monitoring an availability for a group of vehicles, wherein the group of vehicles are of a plurality of different car service companies;

determining match percentages for the group of vehicles, wherein the match percentage is determined according to the location coordinate of the mobile communication device, the request for the vehicle service and location information for the group of vehicles;

selecting a plurality of proposed vehicles from among the group of vehicles according to the match percentages;

generating and providing a fourth wireless message over the network to the mobile communication device responsive to the selecting of the plurality of proposed vehicles, wherein the fourth wireless message comprises an identification of the plurality of proposed vehicles and the match percentages for presentation at a user interface of the mobile communication device, wherein the vehicle service provided by the plurality of proposed vehicles is at a service fee that is determined via a negotiation with the controller circuit prior to the receiving of the third wireless message;

receiving an acceptance message from the mobile communication device, wherein the acceptance message identifies a selected vehicle from among the plurality of proposed vehicles, wherein the negotiation with the controller circuit is based on communications between the controller circuit and a communication device of the selected vehicle; and responsive to the receiving of the acceptance message, generating and providing a dispatch message to the communication device of the selected vehicle to cause presentation of the dispatch message by the communication device.

9. The dispatch system of claim 8, wherein the operations further comprise completing a payment transaction for the vehicle service at the service fee utilizing the credit card data.

10. The dispatch system of claim 9, wherein the fourth wireless message identifies an arrival time for each of the plurality of proposed vehicles.

11. The dispatch system of claim 10, wherein the request comprises a requested pickup time, a destination, and a number of passengers to be transported to the destination.

12. The dispatch system of claim 8, wherein the request identifies a type of automobile.

13. A method, comprising:

determining, by a dispatch processing system of a plurality of dispatch processing systems including a processor comprising a circuit, payment information for a user of a mobile communication device;

receiving, by the dispatch processing system, a first wireless message over a network from the mobile communication device, wherein the first wireless message comprises a location coordinate derived from a location receiver in the mobile communication device and a request for a vehicle service generated by the mobile communication device from user input, wherein other dispatch processing systems of the plurality of dispatch processing systems receive wireless messages from the mobile communications device comprising the location coordinate and the request;

responsive to the receiving of the request for the vehicle service:

monitoring, by the dispatch processing system, an availability for a group of vehicles, wherein the group of vehicles are of a plurality of different car service companies;

determining, by the dispatch processing system, match percentages based on the location coordinate of the mobile communication device, the request for the vehicle service and location information for the group of vehicles;

selecting, by the dispatch processing system, a subgroup of proposed vehicles from among the group of vehicles according to the match percentages; and generating and providing, by the dispatch processing system, a second wireless message over the network to the mobile communication device responsive to the selecting of the subgroup of proposed vehicles, wherein the second wireless message comprises arrival times of vehicles of the subgroup of proposed vehicles, average service fees for the vehicle service, the match percentages for presentation at a user interface of the mobile communication device, and proposed service fees for the vehicle service to be provided by the subgroup of proposed vehicles, wherein the providing of the second wireless message causes the mobile communication device to present the arrival times of the subgroup of proposed vehicles, the average service fees for the vehicle service, and the proposed service fees for the vehicle service at a display device of the mobile communication device, wherein the proposed service fees are determined via negotiations associated with the subgroup of proposed vehicles and the dispatch processing system prior to the receiving of the first wireless message, wherein the proposed service fees that are determined via the negotiations with the dispatch processing system are based on communications between the dispatch processing system and communication devices of the subgroup of proposed vehicles, and wherein the mobile communication device receives from another dispatch processing system of the plurality of dispatch processing systems an identification of an other plurality of proposed vehicles;

receiving, by the dispatch processing system, an acceptance message from the mobile communication device responsive to the second wireless message, wherein the acceptance message identifies a selected vehicle of the subgroup of proposed vehicles, based on a selection obtained by the user interface of the mobile communication device from among a presentation of the subgroup of proposed vehicles and the other plurality of proposed vehicles at the user interface of the mobile communication device;

responsive to the acceptance message, generating and providing, by the dispatch processing system, a dispatch message to the communication device of the selected vehicle to cause presentation of the dispatch message by the communication device; and completing, by the dispatch processing system, a payment transaction for the vehicle service at a proposed service fee of the proposed service fees utilizing the payment information.

14. The method of claim 13, wherein the request identifies a type of automobile.

* * * * *